United States Patent [19]

Budel et al.

[11] 4,368,026
[45] Jan. 11, 1983

[54] CENTERING DEVICE FOR SHAPING TOOLS OF EXTRUSION PRESSES

[75] Inventors: Eduard J. Budel, Al Zwolle, Netherlands; Heinrich Fehrmann, Haren, Fed. Rep. of Germany; Johan de Kok, Ex Hardenberg, Netherlands

[73] Assignee: Wavin B.V., Zwolle, Netherlands

[21] Appl. No.: 226,498

[22] Filed: Jan. 19, 1981

[30] Foreign Application Priority Data

Jan. 18, 1980 [DE] Fed. Rep. of Germany ....... 3001705

[51] Int. Cl.³ .......................... B29D 23/04; B29F 3/04
[52] U.S. Cl. .................................... 425/466; 425/381; 425/467
[58] Field of Search ................... 425/466, 381, 192 R, 425/114, 190, 467

[56] References Cited

U.S. PATENT DOCUMENTS

| | | | |
|---|---|---|---|
| 3,390,430 | 7/1968 | Lynch et al. | 425/381 |
| 3,535,739 | 10/1970 | Mehnert | 425/192 R |
| 3,601,851 | 8/1971 | Heidinger | 425/466 |
| 3,605,190 | 9/1971 | Christy | 425/192 R |
| 3,702,751 | 11/1972 | Mehnert | 425/466 |

FOREIGN PATENT DOCUMENTS

| | | | |
|---|---|---|---|
| 1908933 | 11/1970 | Fed. Rep. of Germany | 425/466 |
| 2023008 | 12/1971 | Fed. Rep. of Germany | 425/466 |
| 2128901 | 1/1973 | Fed. Rep. of Germany | 425/466 |

Primary Examiner—Jeffery R. Thurlow
Attorney, Agent, or Firm—Wilkinson, Mawhinney & Theibault

[57] ABSTRACT

The present disclosure is directed to a centering device for shaping tools for extrusion presses, wherein an outer mandrel together with an inner mandrel define a through gap for plastic extrusion material which device has a plurality of centering members supported on the outer mandrel which are distributed over the periphery of a radial plane and which are adjustable in the radial direction and which are constructed in the form of push rods guided for radial displacement. Each push rod (6,106) has associated therewith an individually adjustable drive, an adjustable lever (7,107) supported for pivoting on the outer mandrel and which are actuable by means of a tightening device (8,108) and form a transmission gear for applying the tightening force. Each adjustable lever is in direct engagement with its push rod in the region between its pivot bearing (13,113) and the point of action of its tightening device whereby the pivotal axes of the adjustable levers (7,107) are aligned parallel to the longitudinal central axis (10,110) of the shaping tool.

10 Claims, 7 Drawing Figures

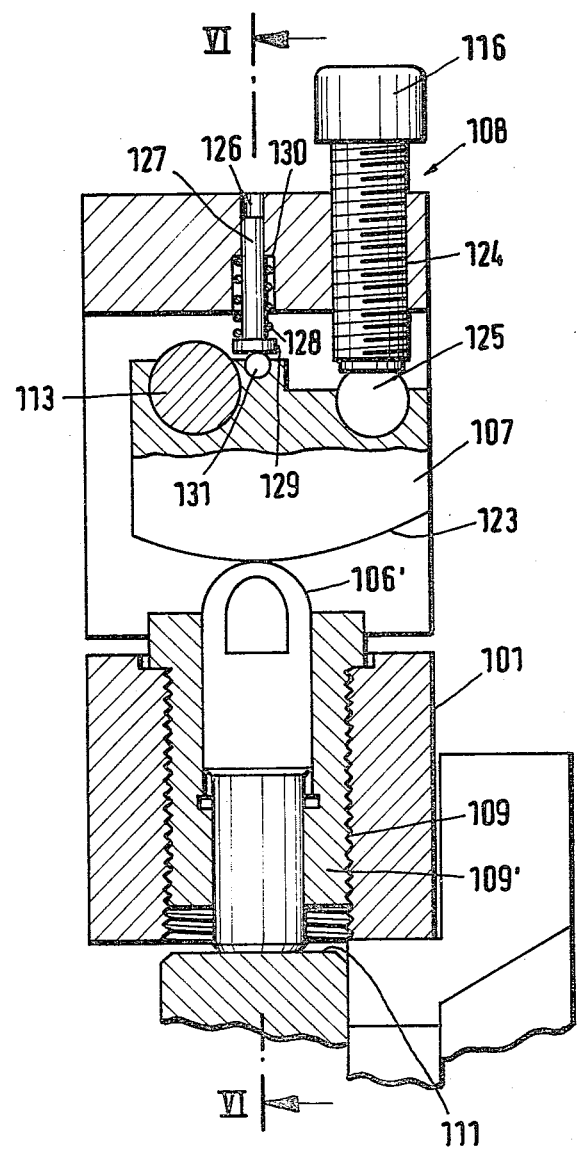

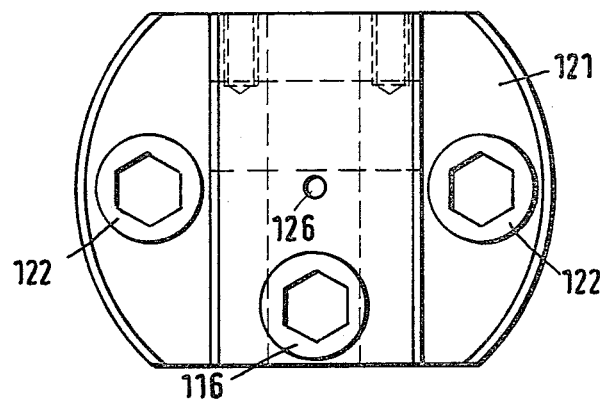
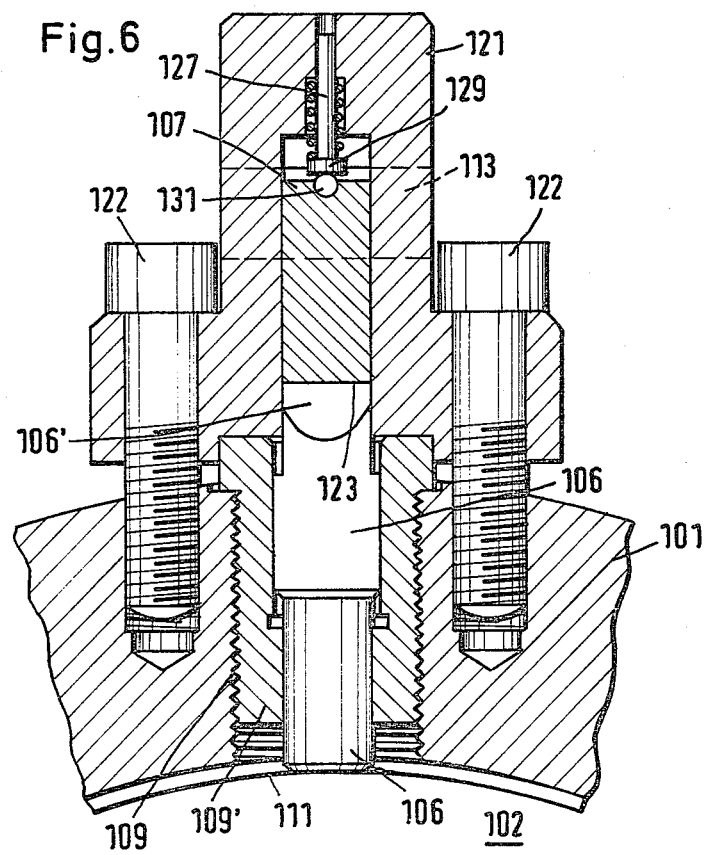

CENTERING DEVICE FOR SHAPING TOOLS OF EXTRUSION PRESSES

The invention relates to a centering device for shaping tools of extrusion presses, wherein an outer mandrel together with an inner mandrel bounds through a gap for plastics material or the like extrusion material, consisting of a plurality of centering members which are supported on the outer mandrel, distributed about the periphery, and are adjustable in the radial direction.

Heretofore, in shaping tools of the said kind, screws have been used as centering members which are received in radial threaded bores in the outer mandrel and are in direct pressure and supporting engagement, by their inner ends, with the part to be centered, for example the inner mandrel or an adjustable nozzle on the outer mandrel. The adjustment of the tool parts in relation to one another for the purpose of achieving a uniform wall thickness in the extruded product involves considerable problems with such a construction of the centering device. Particularly with relatively large tool dimensions, the centering screws require high torques for their adjustment, which are increased by frictional losses and have to be applied by means of large screw spanners. Precise adjustments therefore require work which is expensive in effort and time. Since the supporting ends of the centering screws are in engagement with the part to be adjusted in relation to the outer mandrel under high pressure per unit of area, and turn during adjustemnts, they tend to erode at the surface which has to be countered by a hardening operation.

It is the object of the invention to provide a centering device of the kind referred to at the beginning which renders possible a rapid and precise adjustment of the parts with little expenditure of force.

For this purpose, the centering device according to the invention provides that the centering members are constructed in the form of push rods guided for radial displacement and for their adjustment, adjustable levers are provided which are pivotally supported on the outer mandrel and which can each be actuated by means of a tightening device and form a transmission gear for the tightening force.

The centering device according to the invention permits an adjustment with an expenditure of force reduced to a fraction, which can be applied by means of relatively small geared motors with the result that the adjustment work can be automated. But even with manual actuation, the adjustment can be carried out with great accuracy and in a short time, while wear on the parts is avoided.

The centering device according to the invention is particularly advantageous for extrusion presses having a horizontal extrusion axis as well as for extrusion presses used for the manufacture of particularly thin-walled pipes, in particular also having great diameters. For such extrusion presses particularly high precision is required and a great number of centering rods is needed.

Further developments and advantages of the invention are apparent from the claims and the description in connection with the drawing in which several examples of embodiment of the subject of the invention are illustrated in more detail. In detail:

FIG. 5 shows an enlarged illustration in section of the centering device of FIG. 4;

FIG. 6 shows a section through the centering device on the line 6—6 in FIG. 5; and FIG. 7 shows a plan view of the centering device of FIGS. 5 and 6.

Figure 2:
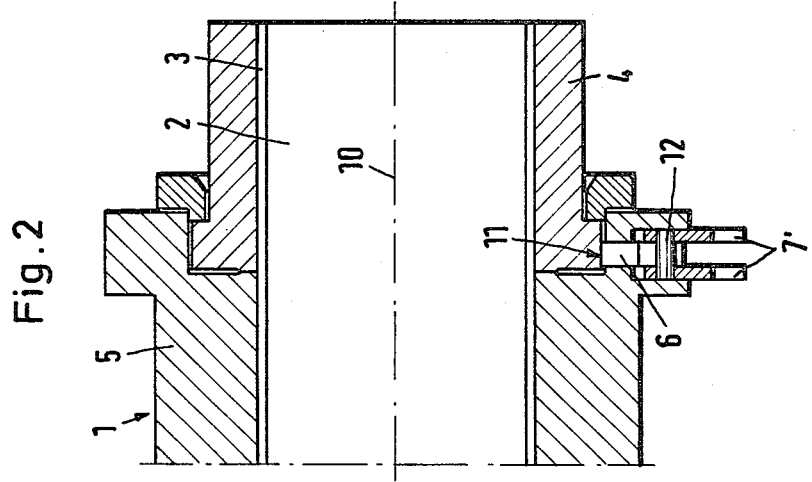
FIG. 2 shows a broken away, simplified axial section through the tool of FIG. 1.
Figure 1:
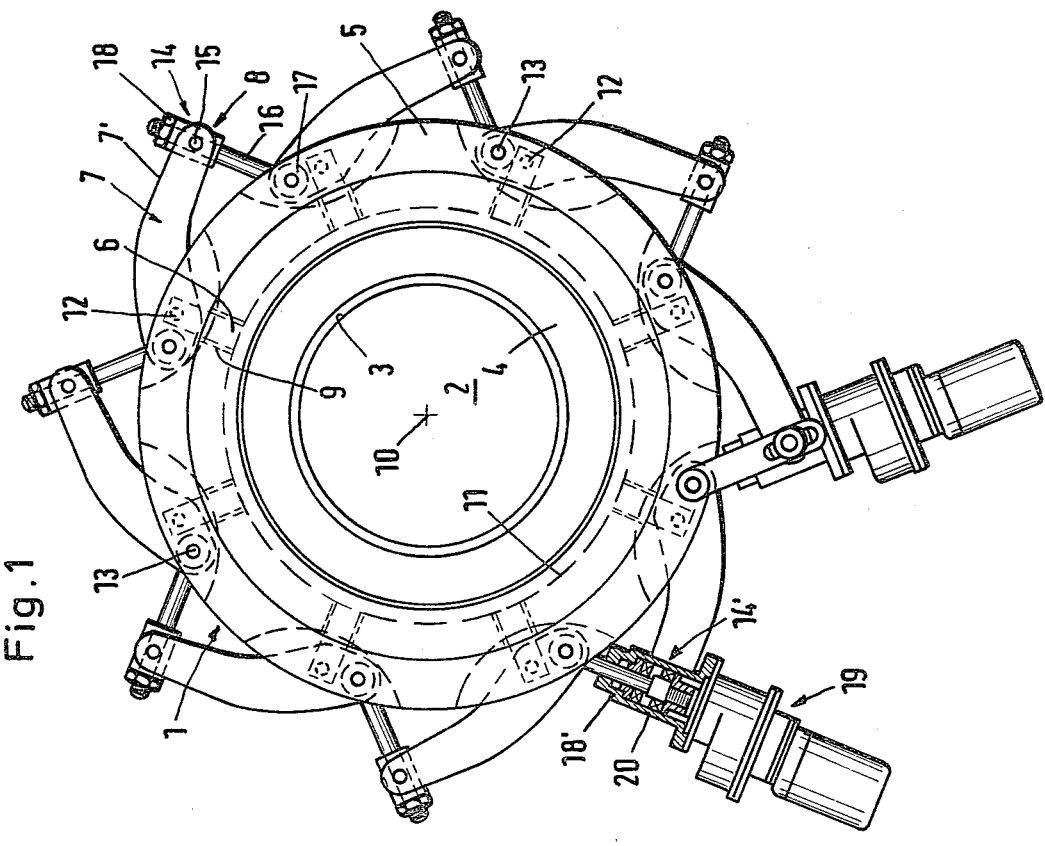
FIG. 1 shows an end view, partially in section, of a shaping tool for an extrusion press with a first embodiment of a centering device according to the invention for the adjustment of a mouth portion of the outer mandrel in relation to the inner mandrel.

The shaping tool illustrated diagrammatically in FIGS. 1 and 2 consists essentially of an outer mandrel or cone 1 and an inner mandrel or cone 2. Together these bound a shaping through gap 3 for plastics material or the like extrusion material. In the example illustrated, this through gap has an annular shape for the production of cylindrical plastics tubes.

In order to achieve a uniform wall thickness, the through gap 3 requires adjustability which, in the example illustrated in FIGS. 1 and 2, is brought about by radial adjustability of the mouth portion or nozzle 4 of the outer mandrel 1 in relation to the inner mandrel 2. For this purpose the mouth portion 4 is supported on the main portion 5 of the outer mandrel 1, which is stationarily connected to the housing (not illustrated) of the extrusion press, through a centering device (and can be located through a clamping flange), which consists of a plurality of push rods 6 (at least three) with adjustable levers 7 and tightening devices 8. The push rods 6 are guided for displacement radially or perpendicular to the longitudinal central axis 10 of the shaping tool, in bores 9 of the main part 5 of the outer mandrel 1. They support the mouth portion 4 on its centering surface 11 with their inner ends and in the region of their outer ends are each connected to their adjustable lever 7 through joint pins 12. As FIG. 2 shows in more detail, this adjustable lever 7 consists of two parallel lever portions 7'. Each adjustable lever 7 is pivotally supported on the main part 5 of the outer mandrel 1 through a pivot pin 13. The pivot axes are aligned parallel to the longitudinal central axis 10 of the shaping tool.

At the free ends, the adjustable levers 7 carry a connecting sleeve 14 which is mounted, by means of diametral pivot pins 15 on the two lever parts 7' of each adjustable lever 7, for pivoting about an axis which extends parallel to the longitudinal central axis 10 of the shaping tool. Engaging through this connecting sleeve 14 is a threaded bolt 16 with an external thread which in turn is articulated for pivoting about a pivotal axis aligned parallel to the longitudinal central axis 10 of the shaping tool, on the main part 5 of the outer mandrel 1. In the example shown in FIGS. 1 and 2, the threaded bolt 16 comprises a bearing eye 17 for this purpose which engages between the lever parts 7' of an adjacent adjustable lever 7 round its pivot pin 13.

Screwed onto the free end of each threaded bolt 16, as illustrated in FIG. 1 for the majority of threaded bolts, is a tightening nut 18 which engages behind the connecting sleeve 14 at the outside. When the tightening nut 18 is tightened, therefore, the adjustable lever 7 transmits a compressive force to its push rod 6, which, as can be seen, amounts to a multiple of the tightening force introduced into the adjustable lever 7. This transmission ratio can easily be made so that even with large shaping tools, the tightening forces are comparatively small and can easily be applied by hand with a normal screw spanner. The tightening forces may be so small that comparatively small electric geared motors can be used as servo motors 19 for the adjusting operation. For such a case, the connecting sleeve may be constructed as a supporting sleeve 14' for the servo motor 19 which can be flange mounted. In its interior, this supporting sleeve 14' receives a tightening nut 18' which forms part of a coupling 20 for the transmission of the drive from the motor shaft of the servo motor 19 to the tightening nut 18. On failure of all or individual servo motors, this renders possible their removal after which the adjusting operation can be carried out by hand by means of a screw spanner. In the case of a motorized drive for the push rods 6 (illustrated for two push rods in FIG. 1), a safety strap 21 or another safety element may be provided for each adjusting lever 7, to prevent the tightening nut 18' from being unscrewed from its pivot bolt 16. With such motorized tightening devices, a fully automatic adjustment can be effected depending on deviations detected in the thickness of the walls from predetermined desired values.

Figure 3:
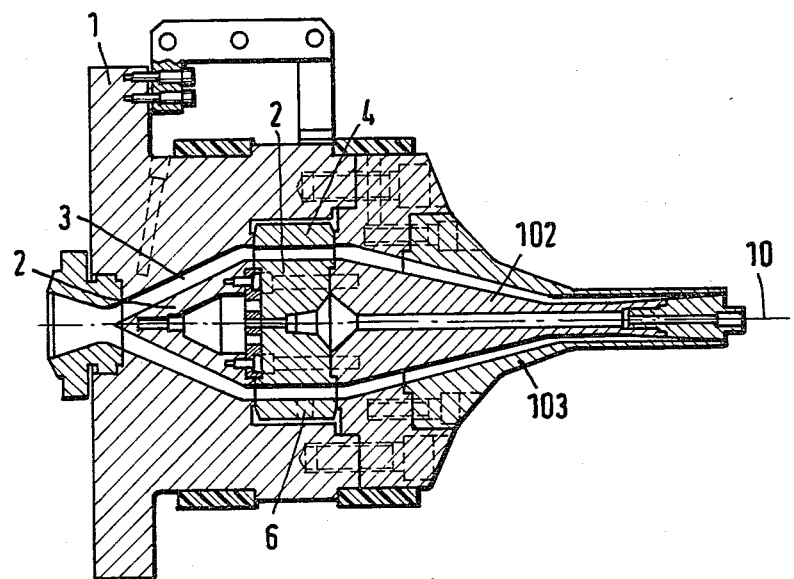
FIG. 3 shows an axial section through another shaping tool with a second embodiment of a centering device according to the invention for the adjustment of the inner mandrel in relation to the outer mandrel.
Figure 4:
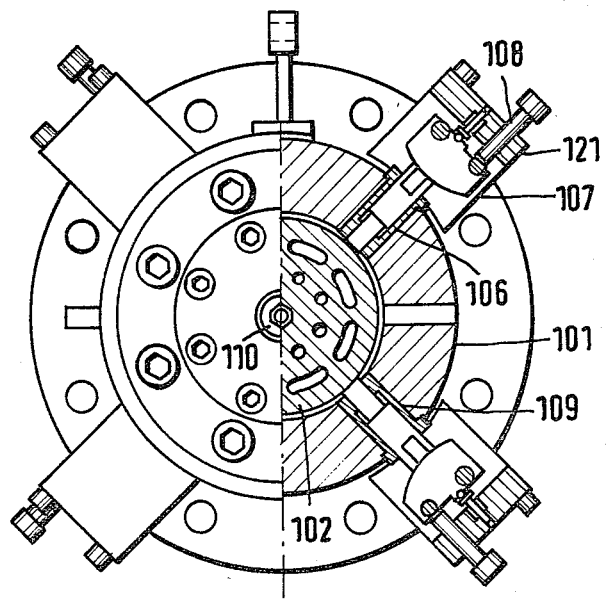
FIG. 4 shows, in the left-hand half an end view and in the right-hand half a cross-section through the tool and centering device of FIG. 3.

FIGS. 3 and 4 illustrate a shaping tool such as is used to produce corrugated tubes. This shaping tool also consists essentially of an outer mandrel 101, an inner mandrel 102 and a through gap 103, bounded by the two, for the passage of the plastics material. In this shaping tool, the centering device according to the invention serves to center or adjust the inner mandrel 102 in relation to the outer mandrel 101. The centering device which can be seen in FIG. 4 but in more detail in FIGS. 5 to 7, consists, in this example, of four cooperating units of like construction. Each of these units comprises a push rod 106 which is guided for radial displacement in a guide sleeve 109' which is inserted in a radial bore 109 in the outer mandrel 101. The inner end of the push rod 106 acts on a centering surface 111 of the inner mandrel 102 and the outer end of the push rod is constructed in the form of a rounded sliding head 106'. Furthermore, each unit comprises an adjustable lever 107 and a tightening device 108 acting on the adjustable lever. Adjustable lever and tightening device are accommodated in a housing 121 which forms a bearing and an abutment and which can be screwed onto the outer mandrel 101 by screws 122. The adjustable lever 107 is mounted in the housing 121 by means of a pivot pin 113 for pivoting about a pivotal axis which in turn is aligned parallel to the longitudinal central axis 110 of the shaping tool. At its side adjacent to the push rod 106, the adjustable lever 107 comprises a curved sector 123 on which the adjustable lever is in pressure engagement with sliding head 106' of the push rod 106.

In this example, the tightening device consists of a tightening screw 116 which can be constructed in the form of a screw with a hexagonal recessed hole and engages through a threaded bore 124 in the housing 121. The end of the set screw 116 acts on a levelling piece 125 mounted in the adjustable lever 107 and which may be formed by a ball, a pin or the like. There is also the possibility of providing the set screw 116 with a corresponding levelling piece at its end, which then engages in a corresponding receiver on the adjustable lever 107. Since the housing 121 more or less hides the adjustable lever 107 from view, the housing is provided with a bore 126 which leads to the outside and in which a measuring pin 127 is inserted as a position indicator. This measuring pin is surrounded by a helical compression spring 128 which is supported on the one hand against a lower flange 129 of the measuring pin 127 and on the other hand on a shoulder 130 of the bore 126 and urges the measuring pin 127 into pressure engagement on the adjustable lever 107. The end of the measuring pin is also in contact with the adjustable lever 107 through a levelling piece 131 which is mounted in the adjustable lever 107.

Such a construction of the centering device can also easily be provided with servo motors for the motorized drive of the tightening screws 116 or corresponding tightening screw elements. The housing 121 offers itself directly as a support for the flange-mounting of a servo motor.

What we claim is:

1. A centering device for shaping tools for extrusion presses, wherein an outer mandrel together with an inner mandrel defines a through gap for plastic extrusion material, comprising a plurality of centering members supported on the outer mandrel, and being distributed about the periphery thereof in a radial plane, means rendering said centering members adjustable in a radial direction, and members being constructed in the form of push rods guided for radial displacement, each push rod (6, 106) having an individually adjustable drive and adjustable lever (7,107) pivotally supported on the outer mandrel and being actuable by means of a tightening device, (8,108) and forming a transmission gear for applying the tightening force, each adjustable lever being in direct engagement with its push rod in the region between its pivot bearing (13,113) and the point of action of its tightening device so that the pivotal axes of the adjustable levers (7,107) are aligned parallel to the longitudinal central axis (10,110) of the shaping tool.

2. A device as claimed in claim 1, wherein the push rods (6) are articulately connected to the adjustable levers (7).

3. A device as claimed in claim 1, wherein the push rods (106) are supported by a rounded sliding head (106') on a curved sector (123) of the adjustable lever (107).

4. A device as claimed in claim 1, wherein the tightening device (8, 108) is constructed in the form of a screw tightening device.

5. A device as claimed in claim 4, wherein the screw tightening device comprises a threaded bolt (16) which engages through a connecting sleeve (14) articulated on the adjustable lever (7), and a tightening nut (18) which engages behind the connecting sleeve.

6. A device as claimed in claim 5, wherein the threaded bolt (16) is articulately connected to a pivot pin (13) which forms the pivotal axis for an adjacent adjustable lever at the same time.

7. A device as claimed in claim 6, wherein the connecting sleeve is constructed in the form of a supporting sleeve (14') for a flange-mountable servo motor (19) and surrounds a coupling (20) transmitting the drive from the motor shaft to the tightening nut (18').

8. A device as claimed in claim 4, wherein the screw tightening device is formed by a tightening screw (116) which is supported in a threaded bore (124) in an abutment (121) and the end of which acts on a levelling piece (125) mounted in the adjustable lever (107) or comprises such a one.

9. A device as claimed in claim 1, wherein adjustable lever (107) and tightening device (108) each form an independent attachment unit which can be screwed on and which is accommodated in a housing (121).

10. A device as claimed in claim 9, whereby a measuring pin which is inserted resiliently in a bore (126) in the housing (121) and is supported on the adjustable lever (107) as a position indicator.

* * * * *